United States Patent
Gillham et al.

(10) Patent No.: US 6,287,472 B1
(45) Date of Patent: Sep. 11, 2001

(54) METHOD FOR TREATING CONTAMINATED WATER

(75) Inventors: Robert W Gillham, Guelph; Marek S Odziemkowski, Kitchener; Stephanie F O'Hannesin, Guelph, all of (CA)

(73) Assignee: University of Waterloo, Waterloo (CA)

( * ) Notice: Subject to any disclaimer, the term of this patent is extended or adjusted under 35 U.S.C. 154(b) by 0 days.

(21) Appl. No.: 09/051,640

(22) PCT Filed: Oct. 18, 1996

(86) PCT No.: PCT/CA96/00691

§ 371 Date: Apr. 16, 1998

§ 102(e) Date: Apr. 16, 1998

(87) PCT Pub. No.: WO97/14656

PCT Pub. Date: Apr. 24, 1997

(30) Foreign Application Priority Data

Oct. 18, 1995 (GB) .................................... 9521293

(51) Int. Cl.[7] ................. C02F 7/00; C02F 1/70
(52) U.S. Cl. .............. 210/747; 210/757; 210/198.1; 210/903; 210/909
(58) Field of Search .................. 210/757, 192, 210/903, 909, 198.1, 747

(56) References Cited

U.S. PATENT DOCUMENTS

| | | |
|---|---|---|
| 3,255,033 * | 6/1966 | Schmeckenbecher . |
| 4,219,419 * | 8/1980 | Sweeny . |
| 4,382,865 * | 5/1983 | Sweeny ................................ 210/743 |
| 5,266,213 * | 11/1993 | Gillham et al. ...................... 210/747 |
| 5,449,249 * | 9/1995 | Husten ................................. 210/247 |
| 5,744,045 * | 4/1998 | Yuen ................................... 210/719 |
| 5,759,389 * | 6/1998 | Fernando et al. ................. 210/198.1 |
| 5,879,555 * | 3/1999 | Khudenko ........................... 210/615 |
| 5,951,852 * | 9/1999 | Fookes ................................ 210/909 |

FOREIGN PATENT DOCUMENTS

| | | | |
|---|---|---|---|
| 0387816 A * | 9/1990 | (EP) ................ | C02F/1/20 |
| 2255087 A * | 10/1992 | (GB) ................ | C02F/1/70 |
| WO 96/20137 * | 7/1996 | (WO) ............... | C02F/1/70 |
| WO 97/04868 * | 2/1997 | (WO) ............... | B01J/23/72 |

* cited by examiner

Primary Examiner—Chester T. Barry
(74) Attorney, Agent, or Firm—Anthony Asquith & Co.

(57) ABSTRACT

Groundwater, or other water contaminated with chlorinated organic contaminants, is passed through a permeable body of iron particles. The particles are coated with nickel, but the coating is incomplete, in that, in patches, the iron is directly exposed. The contaminants break down under prolonged proximity to the iron, the nickel enhancing the catalytic effect. The rate of breakdown is much faster than when bare iron particles were used. When the nickel is alloyed with phosphorus, or boron, even more rapid breakdown rates are achieved.

61 Claims, 3 Drawing Sheets

METHOD FOR TREATING CONTAMINATED WATER

This invention relates to a development of the technology described in U.S. Pat. No. 5,266,213 (GILLHAM), published Jun. 13, 1991.

BACKGROUND TO THE INVENTION

In that technology, dissolved contaminants of the halogenated-organic type are broken down by passing the contaminated water over or through a body of iron granules, such as iron filings. Prolonged proximity to the iron, under strictly anoxic conditions, causes the breakdown reaction.

GENERAL POINTS OF THE INVENTION

It has now been found that coating the particles of iron with a small amount of nickel results in a great improvement in performance with respect to degradation rates of the contaminant. Also, it has been found, in cases where the degradation of the initial contaminant is to a substance that is also an halogenated organic contaminant, that such induced contaminants are less in concentration, and degrade comparatively much more quickly than they degrade when the particles are plain iron.

This new development, i.e coating the iron particles with nickel, gives degradation rates that can be almost an order of magnitude faster than when un-coated iron particles have been used.

It has also been found that, when the iron particles are coated with nickel, the need to exclude oxygen from the body of iron particles is not so dire. Therefore, surface water, industrial waste streams, etc, can be treated, in addition to oxygen-free groundwater.

Enhanced results have been encountered also when the iron particles are coated with an alloy of nickel-boron, or an alloy of nickel-phosphorus.

The manner in which the coating is applied is important. The coating should not be complete, i.e the coating should be patchy, whereby some of the surface of the iron is not coated. Thus, the water, and the contaminants in the water, are exposed to direct contact with the iron.

As regards the type of contaminant that can be treated, not only does the new development apply to the treatment of the halogenated hydrocarbons, as with the original technology, but it is also applicable for the treatment of contaminants of the kind that have nitrogen groups in place of the halogens, for example.

As to the treatment material, other combinations of metals, i.e other than iron coated with nickel, are contemplated. One of the key characteristics of the first metal, i.e., the metal that constitutes the main weight of the treatment material, is that the first metal should be cheap. Iron is good from this standpoint, of course, because of the ready availability of cheap iron and steel scrap from industry. The second metal, i.e., the metal which is applied as a patchy coating to the first metal particles, should be of a lower electrochemical activity than the first metal. Thus, nickel may be used as the second metal for coating iron particles. On the other hand, zinc could not be used as the coating for iron particles.

One of the reasons the coating of the iron particles can be of the desired patchiness, derives from the fact that the iron particles, being scrap from industrial processing, often are rusty, i.e they have a coating of iron oxide. This oxide coating is itself uneven, both as to thickness and as to chemical composition, and this unevenness is of assistance in ensuring that the coating applied to the particles will be patchy.

The plating process tends to remove the oxide, and thus to leave bare the areas of the surface of the particle that are un-coated. The bare metal thus exposed then tends not to re-oxidise, because of the immediate proximity of the patches of the second metal, which sets up an electro-chemical balance. A point to be noted is that if too much second metal (nickel) is used in the coating, some of the nickel leaches out, which is itself a contaminant. The desired small amount of nickel is instrumental in maintaining the electro-chemical balance.

Preferably, in the invention, the coating process is electro-less, in that the coating is of the kind that can be applied to the first metal without the input of electrical energy. An electricity-applied plating process would be much more expensive.

LIST OF DRAWINGS

DESCRIPTION OF PREFERRED EMBODIMENTS, AND OF EXPERIMENTS AND OBSERVATIONS

The apparatuses and procedures depicted in the accompanying drawings and descriptions are examples which embody the invention. It should be noted that the scope of the invention is defined by the accompanying claims, and not necessarily by specific features of exemplary embodiments.

Laboratory tests were conducted to examine the relative performance of nickel-coated iron relative to the regular un-coated material for the reductive de-halogenation (breakdown) of carbon tetrachloride in dilute aqueous solution. In the batch procedures the carbon tetrachloride solution was added to hypo-vials with 10 g of metal and the concentrations of the parent and degradation products were monitored over time. Column experiments with coated and uncoated iron were also performed using different flow rates.

Distribution of degradation products was dependent on residence time in the column. Significant improvements on the degradation rates were observed using the Ni—Fe. Complete disappearance of carbon tetrachloride, chloroform and dichloromethane was achieved after a 3 hour residence time.

In the laboratory tests, a column containing particulate iron was provided: that is to say, iron in the form of filings, powder, or granules, in which the metal is elemental iron (or steel, with the usual steel constituent of a small percentage of alloyed carbon).

Water contaminated with carbon tetrachloride was fed into the column, and samples were drawn off at various times.

Figure 1:
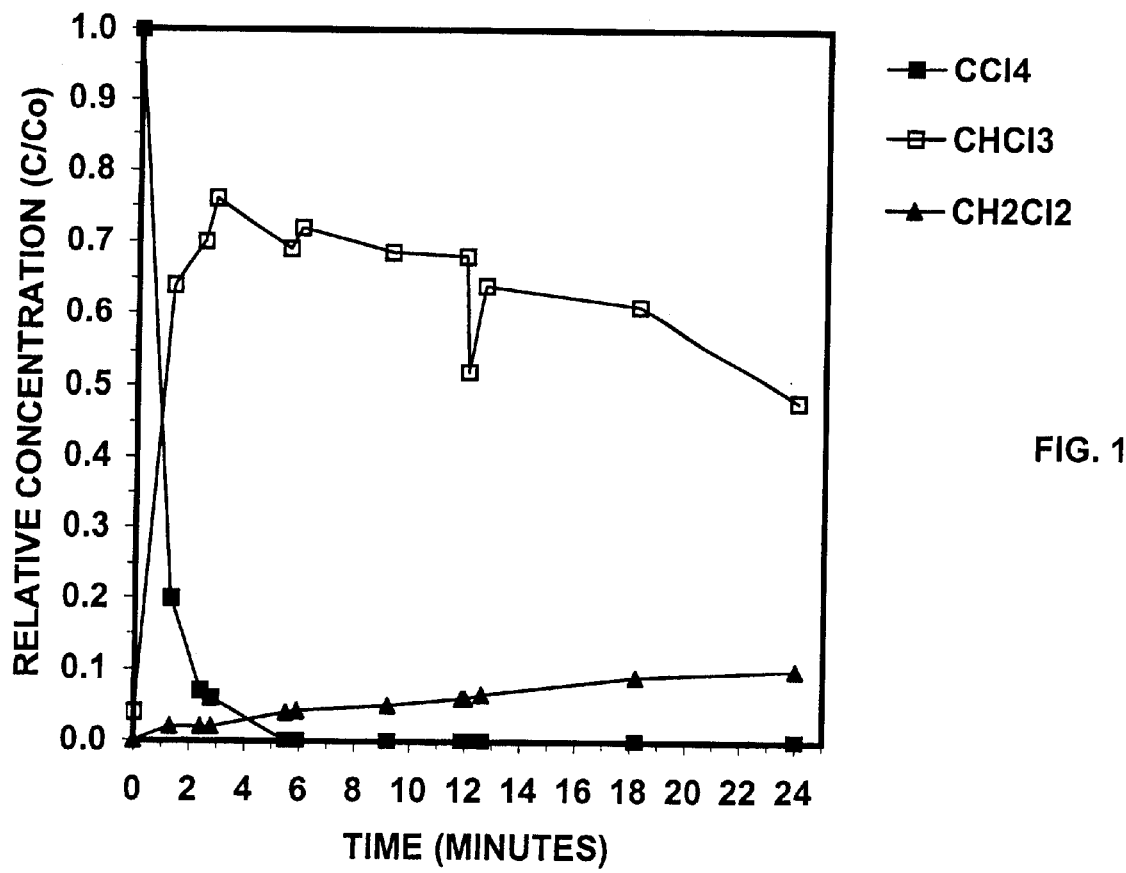
FIG. 1 is a graph showing degradation of carbon tetrachloride (CT) over a period of time, when the degradation results from contact with particulate iron.

FIG. 1 illustrates the expected rapid decline of the carbon tetrachloride—expected, that is to say, from the teachings of the GILLHAM reference. However, as expected, the CT has degraded, not to harmless residues, such as methane and chloride, but to chloroform (TCM), which is also a contaminant. Also, one of the minor, but not negligible, substances resulting from the degradation of CT is the contaminant dichloromethane (DCM).

Thus, although passing water contaminated with carbon tetrachloride through a column of bare iron granules makes the CT disappear very quickly, the resulting products are themselves contaminants, and they degrade rather more slowly—although they do eventually degrade more or less totally to harmless concentrations, and to harmless substances. Actually, the dichloromethane can be long-present, with plain iron.

Figure 2:
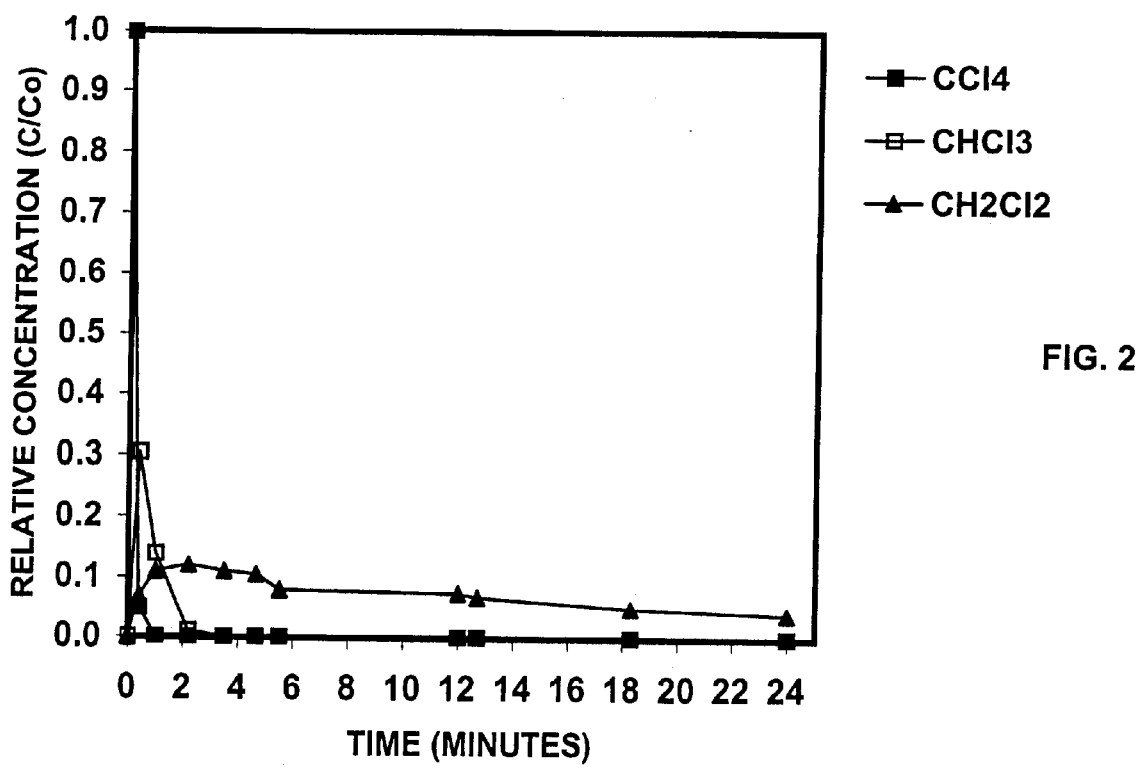
FIG. 2 is a graph showing the corresponding degradation of carbon tetrachloride over time, when the degradation results from contact with particulate iron that has been coated with nickel.

The graph shown in FIG. 2 illustrates the improvement that can arise when the iron particles are coated with nickel.

From FIG. 2, it can be seen that the carbon tetrachloride degrades even faster than in FIG. 1 (uncoated iron); also, the chloroform produced by the degradation of the CT is much less, and degrades faster; and finally the dichloromethane, although produced at first in larger quantities, declines at a measurably faster rate. Coating the iron particles with nickel therefore has a markedly beneficial effect on the totality of the degradation process.

The improvement caused by plating the particles with nickel may be illustrated also by the difference in half-life of the contaminants, when exposed to the iron, as shown in the following table.

TABLE 1

Normalised half lives of the chlorinated compounds
resulting from carbon tetrachloride
degradation (hr · m²/ml)

| Substance | Fe/Ni Column | Fe column |
|---|---|---|
| Carbon tetrachloride | 0.01 | 0.07 |
| Chloroform (TCM) | 0.04 | 3.85 |
| Dichloromethane (DCM) | 3.99 | (no measurable degradation) |

As far as degradation of the CT is concerned, it will be noted that a seven-fold improvement in half-life may be attributed to the step of coating the iron granules with nickel. The TCM degradation is improved almost a hundred-fold. When the iron particles are nickel-coated, the half-life of DCM becomes a significant 3.99 hr.m²/ml, rather than the barely measurable rate found with bare iron.

Marked improvements in the treatment of other contaminant compounds are also observed: for example, the breakdown rate of trichloro-ethene is improved about 20-fold when the iron granules are coated with nickel.

It has been found that even greater improvements in degradation rates may be accomplished when the iron particles are coated, not just with nickel, but with alloys of nickel-boron, and of nickel-phosphorus.

Figure 3:
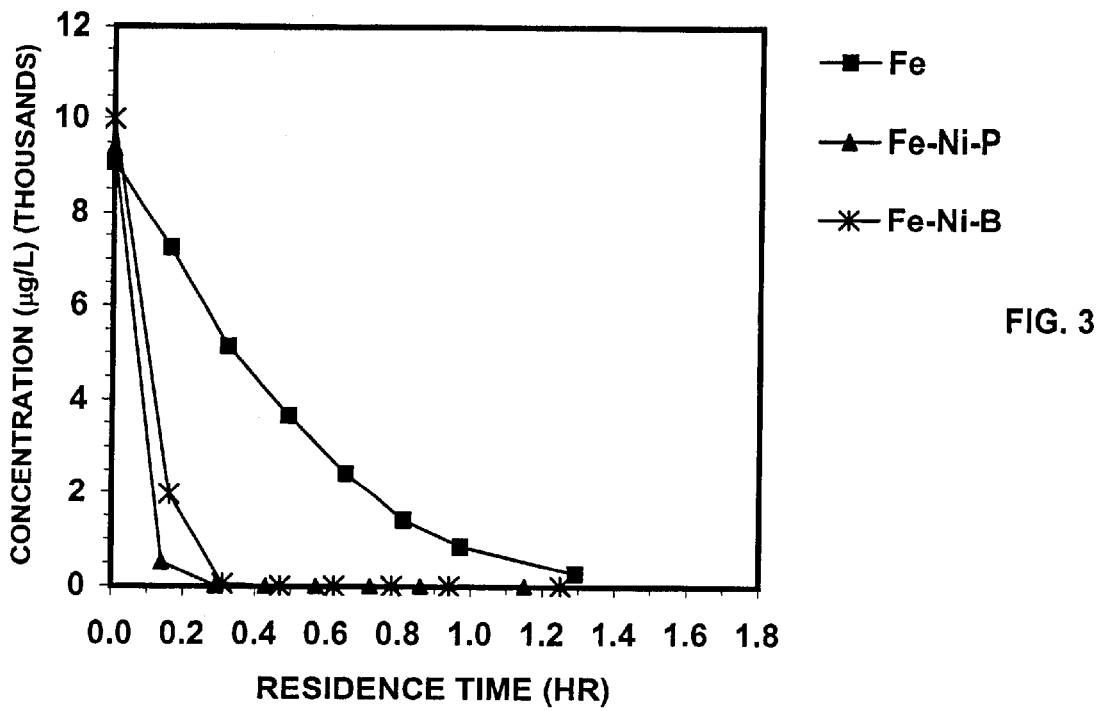
FIG. 3 is a graph showing the corresponding degradation of carbon tetrachloride over time, when the degradation results from contact with particulate iron that has been coated with a nickel-phosphorus alloy, and with a nickel-boron alloy.
Figure 4:
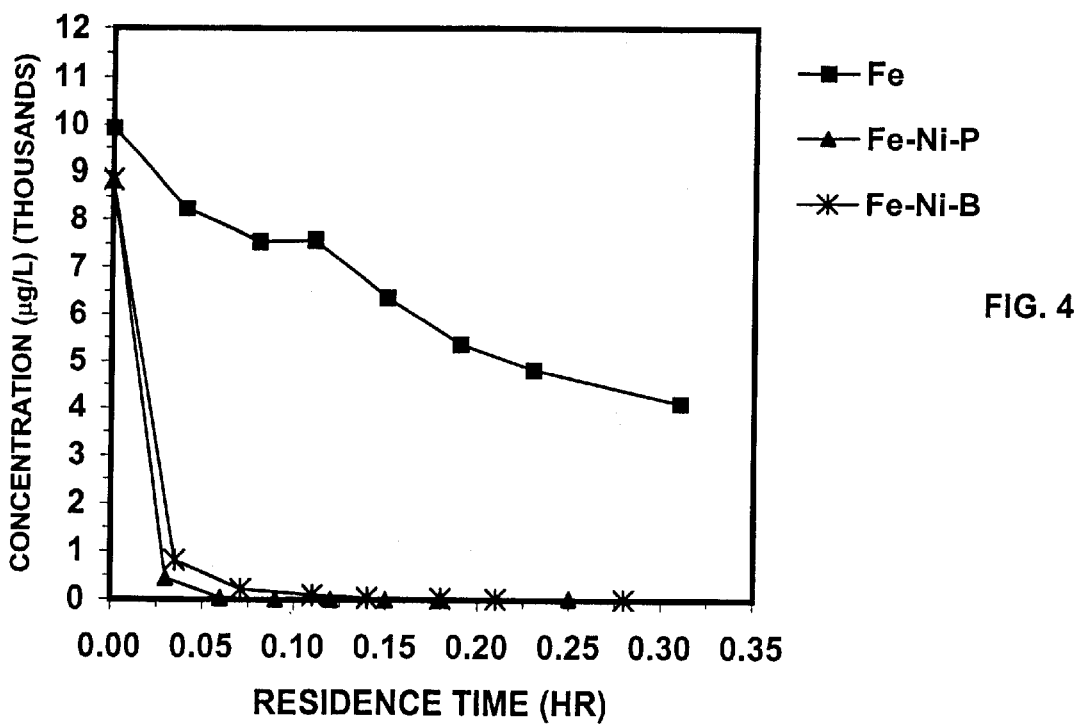
FIG. 4 is a graph of another example of the kinds of degradation shown in FIG. 3, the graph being shown to a larger scale.

FIGS. 3 and 4 illustrate this greater effect. Compared with the bare-iron rate of degradation, the nickel-phosphorus rate is much faster. The nickel-boron rate is almost as fast as the nickel-phosphorus rate. Both are faster still than the degradation rate of iron coated with plain nickel.

The coating of the iron particles with nickel, and with the nickel-boron, and the nickel-phosphorus alloys, was accomplished by immersing the iron particles in a bath containing a suitable solution. In the bath, the iron particles were coated by means of electro-less (i.e no electric current applied) plating.

Prior to immersing the iron particles in the bath, the particles were (partly) coated with oxide. A reducing agent was introduced into the bath, and the composition of the reducing agent determined whether the nickel in the coating was plain, or was alloyed with boron, or phosphorus. The bath contained an acidic solution of nickel salts.

When the reducing agent was hydrazine $N_2H_4$ the coating was pure nickel; when the reducing agent was dimethyl amino borate $(CH_3)_2NH:BH_3$ the coating was the alloy of nickel and boron; when the reducing agent was sodium hypophosphite $NaH_2PO_2$ the coating was the alloy of nickel and phosphorus.

There are other ways of activating the coating of the second metal to adhere to the particles of the first metal, but the procedures as described require no input of electrical energy, which is a great cost advantage.

The effect of the composition of the reducing agent and of the solution is illustrated in the following table.

TABLE 2

Characteristics of the electro-less plating bath for
Ni and Ni-alloys coating of Fe/Fe oxide catalyst support
(Data is given for the bath load of 1 kg of iron,
per liter of plating solution)

| Reducing Agent Compound | Plating Bath Composition Solution | Concentration of solution grams/liter | Temp deg C. | Weight % of Ni |
|---|---|---|---|---|
| 1. (coating = nickel) | | | | |
| $N_2H_4$ | | 30 | | |
| | $NiCl_2.6H_2O$ | 12 | 80 | 0.3 +/− 0.2 |
| | $Na_2C_4O_6.H_2O$ | 7 | | |
| 2. (coating = nickel-boron) | | | | |
| $(CH_3)_2NH:BH_3$ | | 4.8 | | |
| | $NiCl_2.6H_2O$ | 24 | 70 | 0.3 |
| | $CH_3COONa.3H_2O$ | 18 | | |
| 3. (coating = nickel-phosphorus) | | | | |
| $NaH_2PO_2$ | | 13–38 | | |
| | $NiCl_2.6H_2O$ | 3 −> 12 | | |
| | $H_3BO_3$ | 7.5–15 | 60 | 0.074 −> 0.3 |
| | NaF | 2.5–5. | | |

The weights of the nickel deposited in the coatings, as a percentage of the weight of iron, 28 are given in the above table.

In fact, the nickel-boron coating produced under the conditions of item 2 in Table 2 in fact is a triple alloy of nickel-boron-nitrogen. A simple double alloy of nickel-boron could be achieved if sodium boron hydrate were substituted.

A spot analysis was carried out, to ascertain the elements present in the coating at certain spots on the iron particles.

This was an electron probe micro-analysis, performed using an electron beam of energy 20 keV. X-ray energy dispersion was measured at 0.1–0.6 keV and at 10 keV.

The results of this analysis, both for the nickel-phosphorus coating and for the nickel-boron coating, made it clear that the nickel coating is not evenly distributed over the outer surface of the iron particles. It is recognised that this is a key to the efficacy of the degradation reaction. If the nickel were to completely cover the particles, the water (that is to say, the contaminants in the water) would not be exposed directly to the iron. When the coating is patchy, the enhanced-catalytic effect of the nickel can be realised, and yet the reaction is not impeded by an insulating barrier of nickel.

Nickel-plating the particles by immersing them in a bath of nickel salts is one way of realising the required patchy nature of the coating. Preferably, the particles should be irregular in shape, since the irregular shape protects the coating in some places, while the coating is rubbed off in other places. As explained in the GILLHAM reference, the source of the iron particles generally will be the iron filings or other iron/steel debris from industrial machining or fettling processes; therefore, inevitably the particles will be irregularly shaped, but rather such particles are ragged and sharp-edged. Since the body of particles is to comprise a permeable body, it is important that the size of the particles be such that a flow of water can pass therebetween. Thus, the particles should not be dust-like, i.e so small that the particles would settle, in use, whereby the body would lose permeability. On the other hand, the particles should be small; the smaller the particle, the larger its area to weight ratio, i.e the larger the surface area exposed to the water. A particle size of between 1 milligram and 30 milligrams is preferred for the iron particles. Also, the iron particles should be graded for size, i.e the particles making up the body should not differ in size from each other to the extent that smaller particles would fill the interstices between the larger particles, and thereby reduce permeability. Size grading where the weight of the smallest particles is no less than about a tenth of the weight of the large particles, is appropriate.

It may be noted that, in expressing the size of the particle as above, it is assumed that the particle is solid metal, which is what is likely to be encountered in scrap metal. However, if the metal is, for example, porous, whereby the particle has a quite different weight-to-area ratio, the particle weight would be less.

Given that the nickel coating is patchy, and that the iron particles are irregularly-shaped, and especially sharp-edged, and in the above size range, preferably the nickel coating on the iron particle should weigh between about 0.01 percent and 5 percent of the weight of the particle.

It has been mentioned that the nickel coating should be patchy, i.e that patches of the bare iron should be exposed; but it is recognised that the coating does not need to be totally absent in the bare patches. The coating may be characterised as patchy on the following basis: first, an electron probe micro-analysis, using an electron beam of energy 20 keV, is carried out at ten spots on the particle, to determine whether nickel is present at those spots; if nickel is not detected at this energy level, the spot is deemed to be bare of nickel; if nickel is detected at this energy level, the spot is deemed to be coated with nickel; of the ten spots, between one and five should be bare of nickel, and between three and eight should be coated with nickel.

The manner of applying the coatings, as described, gives rise to a coating that is even as to its composition, where it is present. That is to say, where the coating is present, the proportion of boron, or phosphorus, relative to the nickel, in the coating remains about the same. For a given composition of the bath, the time the iron filings spend in the bath determines the weight of the coating, and it is important that the temperature of the bath be maintained. A typical time for the iron particles to spend in the plating bath is 1 or 2 hours.

It was noted that the fastest degradation rates came when the iron particles were coated with the nickel-phosphorus alloy. In this case, phosphorus acts as a metal hydriding process activator—the effect being analogous to the known effect of alloying phosphorus with palladium in some catalyst applications. The activator is called variously the promoter, or transfer catalyst, by analogy. When adsorbed onto the metal surface, the transfer catalyst activates co-adsorbed hydrogen to cross the barrier of metal-gas or metal-liquid interface, and to become incorporated into the metal lattice to form a nickel hydride hydrogenation catalyst.

It is understood that the plain nickel and the nickel-boron coatings are less effective than the nickel-phosphorus coating, as regards the hydrogenation reaction, due to the absence of an effective transfer catalyst. It may be noted that boron does not fall into the category of a hydrogen-entry-promoter.

The effectiveness also of some rare earth intermetallic compounds is known, as a catalyst for hydrogenation reactions. Their unusual effectiveness in breaking the hydrogen bond is attributed to the high rate of hydrogen absorption.

The structures to be used for treating a real body of contaminated water are determined by where the water is to be treated. If the water is treated in the ground, it is to be preferred if the water, while remaining in the ground, can be caused to flow through an in-ground body of the nickel-coated iron particles. Thus, if the ground is of such a nature as to permit a flow of good velocity, and if the iron particles can be placed in a trench or other receptacle in the path of the flowing contaminated water, that is generally the cheapest clean-up solution.

Figure 5:
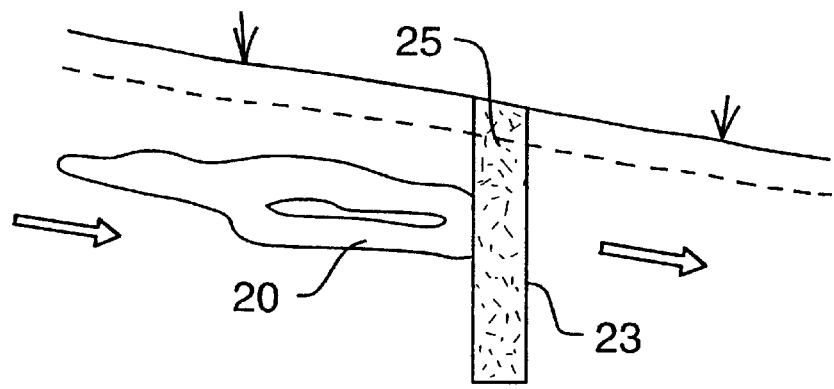
FIG. 5 illustrates a treatment apparatus for treating in-ground groundwater, while the water remains in its native aquifer.

FIG. 5 illustrates a typical set-up. The plume 20 of contaminated water, in travelling through the aquifer, passes through a trench 23, which has been excavated in the path of the oncoming plume. The body of nickel-coated iron particles 25 is placed in the trench 23.

One of the benefits of keeping the water in the ground, i.e below ground, is that it is then simple to keep oxygen away from the water; the presence of oxygen, or oxidising agents, inhibits the breakdown reaction, even to the point of stopping the reaction.

Sometimes, however, it is cheaper to take contaminated groundwater out of the ground, and convey the water into and through an above-ground vessel. The nickel-coated iron particles are placed in the vessel, and the water passes through the particles. The treated water may be used immediately, or the water may be discharged, after treatment, for example into a river or stream.

Figure 6:
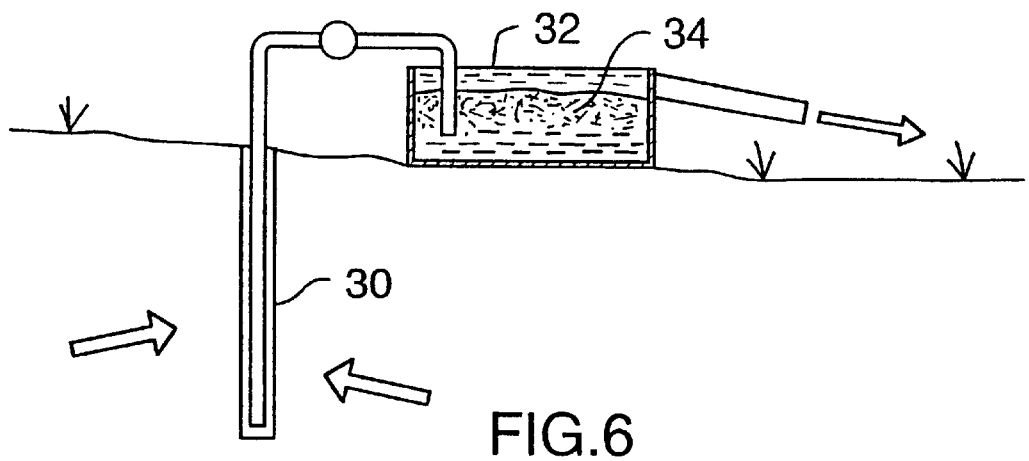
FIG. 6 illustrates a treatment apparatus for treating groundwater that has been removed from its native aquifer.

FIG. 6 illustrates a typical set-up. Groundwater is drawn out of a well 30, and pumped into an above-ground vessel 32, which contains the body of nickel-coated iron particles 34.

It may be noted that the presence of the nickel coating increases the rate of the breakdown reaction, to the extent that even if some oxidising agents might be present, yet still the breakdown reaction will take place. Thus, the above-ground option was contra-indicated (because of the need to exclude oxygen) in the case where the treatment material was straight iron, as in the GILLHAM reference; but with the nickel-coated iron the above-ground option is much more likely to be viable.

In cases where a cheap bulk filler material is required, which is inert with respect to the breakdown reaction, generally sand is suitable. The grain sizes of the sand should be compatible with the particle-sizes of metal, for avoidance of clogging.

Figure 7:
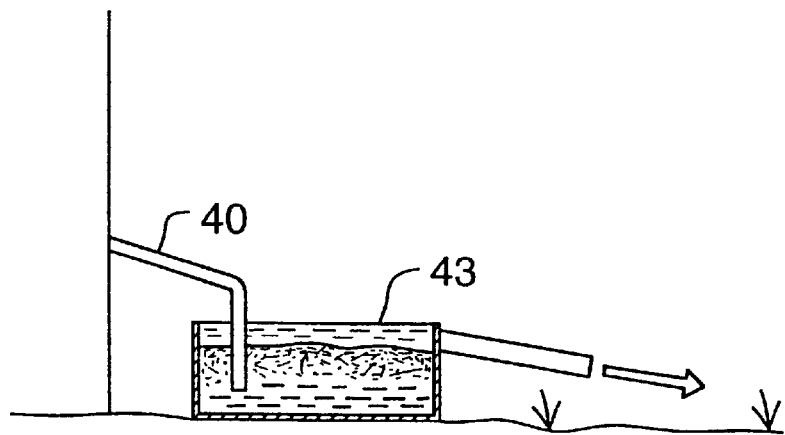
FIG. 7 illustrates a treatment apparatus for treating contaminated water in an effluent stream from an industrial process.

Sometimes again, the water to be treated might be the effluent from an industrial process. FIG. 7 illustrates a typical set-up. The effluent is present in pipe 40, which discharges into an above-ground vessel 43. In this case, the general rule would be that the effluent water does contain oxygen, whereby the straight iron of GILLHAM would be quite unsuitable.

The need to exclude oxygen, and oxygen-supplying substances, arises because the breakdown reaction does not start until the Eh voltage of the water has become negative. However, when the iron particles are plated with nickel, the reaction can commence even though the Eh probe may still be registering (slightly) positive voltages.

On the other hand, if oxygen is scrupulously excluded, it is likely that the residence time needed to complete the breakdown reaction will in that case be shorter; that is to say, the time the molecules of the contaminant need to spend in close proximity to the iron, is shorter. In the case of the below-ground treatment, where oxygen is substantially completely not present, and excluded, the residence time to break down the contaminants would be at its shortest.

In a typical clean-up case, the prudent designer carries out a survey to determine the nature and extent of the contamination, its chemical composition and concentration, its velocity, the permeability of the ground, and so on. Samples are taken, and experiments are conducted in the laboratory, to determine the initial maximum concentration C. In a case where the water has to be taken to drinking water standards, the safe level $C_0$ for that contaminant is ascertained. Tests show the degradation rate at which that contaminant breaks down, using the coated metal particles, as described. Degradation takes place exponentially, whereby it is convenient to measure the rate in terms of half-life, HL, which is the time it takes for the concentration level of that contaminant to be halved.

For example, a body of moving groundwater may contain a plume of TCE, having a maximum concentration of 320 micrograms per liter of water. The drinking water limit for TCE (in many jurisdictions) is 5 micrograms per liter. Experiments show that, with the nickel-coated iron-particles available, the degradation half-life HL is, say, 2 minutes. In the first two minutes, the concentration will drop to 160 micrograms per liter; then two minutes after that to 80, then two minutes later to 40, then 20, then 10, then 5. Thus, a total of six half-lives, or twelve minutes, should bring the concentration down to drinking water standards.

The designer therefore should engineer the system to ensure that the water stays in contact with the nickel-coated iron-particles for at least 12 minutes, plus whatever margin of safety is deemed appropriate. The faster the velocity of the groundwater (often, there is not much the engineer can do to change the velocity of the water), the longer he should make the path through the body of particles, to achieve the required residence time.

It may be noted that, as mentioned in GILLHAM, metals other than iron can give rise to the breakdown reaction. It has also been found that coating iron particles with a metal other than nickel—palladium, for instance—gives beneficial results. However, providing a palladium coating is much more expensive than providing a nickel, nickel-boron, or nickel-phosphorus, coating.

What is claimed is:

1. Procedure for treating contaminated water, wherein:

the contaminant in the water is a hydrocarbon, and is of the kind that can undergo reductive degradation;

the procedure includes providing a body of particles of a first metal;

the particles of the first metal are sharp-edged;

the procedure includes applying a layer of a second metal to the particles of the first metal;

the layer of the second metal, thus applied to the particles of the first metal, is patchy with respect to the surface of the particle, in that the second metal does not entirely cover the total surface area of the particle;

the second metal is less electro-chemically active than the first metal;

the body of particles, thus provided, is of such consistency as to be permeable to the passage of water therethrough;

the procedure includes conducting a flow of the contaminated water through the permeable body of particles;

and the procedure includes maintaining the contaminated water in contact with the particles for a sufficient residence time that chemical breakdown of the contaminant occurs;

wherein the particles are particles of iron, and the second metal layer includes nickel.

2. Procedure of claim 1, wherein the particles of iron are mixed with particles of another substance, which is inert with respect to the breakdown reaction.

3. Procedure of claim 1, wherein the second metal layer consists of substantially pure nickel.

4. Procedure of claim 1, wherein the second metal layer comprises an alloy of nickel and a non-metal, being one of the following: nickel-boron; nickel-phosphorus; nickel-boron-nitrogen.

5. Procedure of claim 1, wherein the procedure includes so applying the second metal layer that the weight of the layer is more than 0.01 percent, and less than 5 percent, of the weight of the particle.

6. Procedure of claim 5, wherein the percentage of the surface area of the second metal layer to the total surface area of the particle is between ten percent and ninety-five percent.

7. Procedure of claim 6, wherein the percentage of the surface area of the second metal layer to the total surface area of the particle is between fifty percent and seventy-five percent.

8. Procedure of claim 1, wherein the particles of the first metal are of solid metal, and have a weight of between 1 milli-gram and 30 milli-grams.

9. Procedure of claim 1, wherein the contaminant is a halogenated or nitrogenated hydrocarbon.

10. Procedure of claim 1, wherein:

the contaminant is of the type that is a contaminant even though present in the water only in tiny traces;

whereby breakdown substances accumulate in, and are present in, such small quantities as to leave the body of particles permeable;

and the breakdown substances are of the kind that are non-contaminating in the tiny trace quantities.

11. Procedure of claim 1, wherein the contaminated water is groundwater in its native aquifer, having a velocity therethrough, and wherein conducting the flow of the contaminated water through the permeable body of particles comprises placing the body of particles in the ground, in the path of the moving groundwater.

12. Procedure of claim 1, wherein the procedure includes placing the body of particles in a vessel, above ground, and wherein conducting the flow of the contaminated water through the permeable body of particles comprises conveying the contaminated water into and through the vessel.

13. Procedure of claim 1, wherein the procedure includes substantially excluding oxygen and oxygen-supplying substances, from the water, and from the body of metal particles.

14. Procedure of claim 1, wherein the breakdown of the contaminant is into chemical substances which are non-solid and are consequently borne away with water leaving the body of particles, and which are of such low toxicity as to be safe at the concentrations produced.

15. Procedure of claim 1, wherein:
the procedure includes carrying out a survey and making a preliminary determination that the contaminant is one that can be broken down by prolonged proximity with a metal;
the procedure includes providing the body of metal particles in sufficient quantity, and conducting contaminated water through at such a flow rate, as to cause the concentration of the contaminant to drop to a predetermined safe level of the contaminant.

16. Procedure of claim 15, wherein:
the step of carrying out the survey includes carrying out measurements to determine the concentration C of the contaminant in the water, of noting the predetermined safe level of concentration $C_0$ of that contaminant, of carrying out measurements to determine the half-life HL of that contaminant when placed in close proximity to the coated particles;
the steps of providing the body of metal particles, and of conducting the water therethrough at such a flow rate, are such as to cause the contaminants in the water to have a residence time RT in close proximity to the particles, where RT is a sufficient number of multiples of HL as to cause the concentration to drop from C to $C_0$.

17. Procedure of claim 1, wherein the step of applying the second metal layer includes immersing the particles of metal in an electro-less bath containing salts of the substance which is to be coated onto the particles.

18. Procedure of claim 17, where the electro-less bath contains one of: $NiCl_2.6H_2O$; $Na_2C_4O_6.H_2O$; $CH_3COONa.3H_2O$; $H_3BO_3$; and NaF.

19. Procedure of claim 17, wherein the electro-less bath also contains a reducing agent, comprising one of: hydrazine; dimethyl amino borate; sodium hypo-phosphite; and sodium-boron hydrate.

20. Procedure of claim 1, wherein the sharp-edged particles are irregularly in shape, and comprise scrap from industrial machining or fettling processes.

21. Procedure for treating contaminated water, wherein:
the contaminant in the water is a hydrocarbon, and is of the kind that can undergo reductive degradation;
the procedure includes providing a body of particles of a first metal;
the procedure includes ensuring that the said particles of the first metal are initially coated with a coating which includes an oxide of the first metal;
the procedure includes applying a layer of a second metal to the particles of the first metal, over the said oxide coating;
the layer of the second metal, thus applied to the particles of the first metal, is patchy with respect to the surface of the particle, in that the second metal does not entirely cover the total surface area of the particle;
the second metal is less electro-chemically active than the first metal;
the body of particles, thus provided, is of such consistency as to be permeable to the passage of water therethrough;
the procedure includes conducting a flow of the contaminated water through the permeable body of particles;
and the procedure includes maintaining the contaminated water in contact with the particles for a sufficient residence time that chemical breakdown of the contaminant occurs;
wherein thee particles are particles of iron, and the second metal, being the metal of the layer, includes nickel.

22. Procedure of claim 21, wherein the oxide coating is uneven.

23. Procedure of claim 21, wherein the particles are mixed with particles of another substance, which is inert with respect to the breakdown reaction.

24. Procedure of claim 21, wherein the second metal layer consists of substantially pure nickel.

25. Procedure of claim 21, wherein tie second metal layer comprises an alloy of nickel and a non-metal, being one of the following: nickel-boron; nickel-phosphorus; nickel-boron-nitrogen.

26. Procedure of claim 21, wherein the procedure includes so applying the second metal layer that the weight of the layer is more than 0.01 percent, and less than 5 percent, of the weight of the particle.

27. Procedure of claim 26, wherein the percentage of the surface area of the second metal layer to the total surface area of the particle is between ten percent and ninety-five percent.

28. Procedure of claim 27, wherein the percentage of the surface area of the second-metal layer to the total surface area of the particle is between fifty percent and seventy-five percent.

29. Procedure of claim 21, wherein the particles are of solid metal, and have a weight of between 1 milli-gram and 30 milli-grams.

30. Procedure of claim 21, wherein the contaminant is a halogenated or nitrogenated hydrocarbon.

31. Procedure of claim 21, wherein:
the contaminant is of the type that is a contaminant even though present in the water only in tiny traces;
whereby breakdown substances accumulate in, and are present in, such small quantities as to leave the body of particles permeable;
and the breakdown substances are of the kind that are non-contaminating in the tiny trace quantities.

32. Procedure of claim 21, wherein the contaminated water is groundwater in its native aquifer, having a velocity therethrough, and wherein conducting the flow of the contaminated water through the permeable body of particles comprises placing the body of particles in the ground, in the path of the moving groundwater.

33. Procedure of claim 21, wherein the procedure includes placing the body of particles in a vessel, above ground, and wherein conducting the flow of the contaminated water through the permeable body of particles comprises conveying the contaminated water into and through the vessel.

34. Procedure of claim 21, wherein the procedure includes substantially excluding oxygen and oxygen-supplying substances, from the water, and from the body of metal particles.

35. Procedure of claim 21, wherein the breakdown of the contaminant is into chemical substances which are non-solid and are consequently borne away with water leaving the body of particles, and which are of such low toxicity as to be safe at the concentrations produced.

36. Procedure of claim 21, wherein:
the procedure includes carrying out a survey and making a preliminary determination that the contaminant is one that can be broken down by prolonged proximity with a metal;
the procedure includes providing the body of metal particles in sufficient quantity, and conducting contaminated water through at such a flow rate, as to cause the concentration of the contaminant to drop to a predetermined safe level of the contaminant.

37. Procedure of claim 36, wherein:
the step of carrying out the survey includes carrying out measurements to determine the concentration C of the contaminant in the water, of noting the predetermined safe level of concentration $C_0$ of that contaminant, of carrying out measurements to determine the half-life HL of that contaminant when placed in close proximity to the coated particles;
the steps of providing the body of metal particles, and of conducting the water therethrough at such a flow rate, are such as to cause the contaminants in the water to have a residence time RT in close proximity to the particles, where RT is a sufficient number of multiples of HL as to cause the concentration to drop from C to $C_0$.

38. Procedure of claim 21, wherein the step of applying the second-metal layer includes immersing the oxide-coated particles of the first metal in an electro-less bath containing salts of the substance which is to be coated onto the particles.

39. Procedure of claim 38, where the electro-less bath contains one of: $NiCl_2.6H_2O$; $Na_2C_4.O_6.H_2O$; $CH_3COONa.3H_2O$; $H_3BO_3$; and NaF.

40. Procedure of claim 38, wherein the electro-less bath also contains a reducing agent, comprising one of: hydrazine; dimethyl amino borate; sodium hypo-phosphite; and sodium-boron hydrate.

41. Procedure of claim 21, wherein the particles are sharp-edged, are irregularly in shape, and comprise scrap from industrial machining or fettling processes.

42. Procedure for treating contaminated water, wherein:
the contaminant in the water is a hydrocarbon, and is of the kind that can undergo reductive degradation;
the procedure includes providing a body of particles of a first metal;
the procedure includes applying a layer to the particles of the first metal;
wherein the layer comprises an alloy of nickel and a non-metal, being one of the following: nickel-boron; nickel-phosphorus; nickel-boron-nitrogen;
the alloy layer, thus applied to the particles of metal, is patchy with respect to the surface of the particle, in that the alloy layer does not entirely cover the total surface area of the particle;
nickel is less electro-chemically active than the first metal;
the body of particles, thus provided, is of such consistency as to be permeable to the passage of water therethrough;
the procedure includes conducting a flow of the contaminated water through the permeable body of particles;
and the procedure includes maintaining the contaminated water in contact with the particles for a sufficient residence time that chemical breakdown of the contaminant occurs.

43. Procedure of claim 42, wherein the first metal of the particles is iron.

44. Procedure of claim 43, wherein the particles of iron are mixed with particles of another substance, which is inert with respect to the breakdown reaction.

45. Procedure of claim 42, wherein the procedure includes so applying the alloy layer that the weight of the alloy layer is more than 0.01 percent, and less than 5 percent, of the weight of the particle.

46. Procedure of claim 45, wherein the percentage of the surface area of the alloy layer to the total surface area of the particle is between ten percent and ninety-five percent.

47. Procedure of claim 46, wherein the percentage of the surface area of the alloy layer to the total surface area of the particle is between fifty percent and seventy-five percent.

48. Procedure of claim 42, wherein the particles are of solid metal, and have a weight of between 1 milli-gram and 30 milli-grams.

49. Procedure of claim 42, wherein the contaminant is a halogenated or nitrogenated hydrocarbon.

50. Procedure of claim 42, wherein:
the contaminant is of the type that is a contaminant even though present in the water only in tiny traces;
whereby breakdown substances accumulate in, and are present in, such small quantities as to leave the body of particles permeable;
and the breakdown substances are of the kind that are non-contaminating in the tiny trace quantities.

51. Procedure of claim 42, wherein the contaminated water is groundwater in its native aquifer, having a velocity therethrough, and wherein conducting the flow of the contaminated water through the permeable body of particles comprises placing the body of particles in the ground, in the path of the moving groundwater.

52. Procedure of claim 42, wherein the procedure includes placing the body of particles in a vessel, above ground, and wherein conducting the flow of the contaminated water through the permeable body of particles comprises conveying the contaminated water into and through the vessel.

53. Procedure of claim 42, wherein the procedure includes substantially excluding oxygen and oxygen-supplying substances, from the water, and from the body of metal particles.

54. Procedure of claim 42, wherein the breakdown of the contaminant is into chemical substances which are non-solid and are consequently borne away with water leaving the body of particles, and which are of such low toxicity as to be safe at the concentrations produced.

55. Procedure of claim 42, wherein:
the procedure includes carrying out a survey and making a preliminary determination that the contaminant is one that can be broken down by prolonged proximity with a metal;
the procedure includes providing the body of metal particles in sufficient quantity, and conducting contaminated water through at such a flow rate, as to cause the concentration of the contaminant to drop to a predetermined safe level of the contaminant.

56. Procedure of claim 55, wherein:

the step of carrying out the survey includes carrying out measurements to determine the concentration C of the contaminant in the water, of noting the predetermined safe level of concentration $C_0$ that contaminant, of carrying out measurements to determine the half-life HL of that contaminant when placed in close proximity to the coated particles;

the steps of providing the body of metal particles, and of conducting the water therethrough at such a flow rate, are such as to cause the contaminants in the water to have a residence time RT in close proximity to the particles, where RT is a sufficient number of multiples of HL as to cause the concentration to drop from C to $C_0$.

57. Procedure of claim 42, wherein the step of applying the alloy layer includes immersing the particles of metal in an electro-less bath containing salts of the substance which is to be coated onto the particles.

58. Procedure of claim 57, where the electro-less bath contains one of: $NiCl_2.6H_2O$; $Na_2C_4.O_6.H_2O$; $CH_3COONa.3H_2O$; $H_3BO_3$; and NaF.

59. Procedure of claim 57, wherein the electro-less bath also contains a reducing agent, comprising one of: hydrazine; dimethyl amino borate; sodium hypo-phosphite; and sodium-boron hydrate.

60. Procedure of claim 42 wherein:

the procedure includes ensuring that the said particles of the first metal are initially coated with a coating which includes an oxide of the first metal;

the procedure includes applying the alloy layer to the particles of the first metal, over the said oxide coating.

61. Procedure of claim 42, wherein the particles are sharp-edged, are irregularly in shape, and comprise scrap from industrial machining or fettling processes.

* * * * *